(12) United States Patent
Bigioi et al.

(10) Patent No.: US 11,727,426 B2
(45) Date of Patent: Aug. 15, 2023

(54) ANONYMIZING FACIAL EXPRESSION DATA WITH A SMART-CAM

(71) Applicant: FotoNation Limited, Galway (IE)

(72) Inventors: Petronel Bigioi, Galway (IE); Peter Corcoran, Claregalway (IE)

(73) Assignee: FotoNation Limited

( * ) Notice: Subject to any disclaimer, the term of this patent is extended or adjusted under 35 U.S.C. 154(b) by 838 days.

(21) Appl. No.: 16/551,415

(22) Filed: Aug. 26, 2019

(65) Prior Publication Data

US 2019/0385184 A1    Dec. 19, 2019

Related U.S. Application Data

(63) Continuation of application No. 14/282,790, filed on May 20, 2014, now Pat. No. 10,402,846.

(60) Provisional application No. 61/825,933, filed on May 21, 2013.

(51) Int. Cl.
*G06Q 30/0217* (2023.01)
*G06Q 30/0201* (2023.01)

(52) U.S. Cl.
CPC ..... *G06Q 30/0217* (2013.01); *G06Q 30/0201* (2013.01)

(58) Field of Classification Search
CPC ........... G06Q 30/0201; G06Q 30/0217; G06Q 30/0207; G06Q 30/02
See application file for complete search history.

(56) References Cited

U.S. PATENT DOCUMENTS

| | | | |
|---|---|---|---|
| 6,712,468 B1 | 3/2004 | Edwards | |
| 6,766,370 B2 * | 7/2004 | Glommen | G06F 11/3495 709/224 |
| 6,839,680 B1 * | 1/2005 | Liu | G06Q 30/0204 705/7.33 |
| 7,551,754 B2 | 6/2009 | Steinberg et al. | |
| 7,620,218 B2 | 11/2009 | Steinberg et al. | |
| 7,792,335 B2 | 9/2010 | Steinberg et al. | |
| 7,804,983 B2 | 9/2010 | Steinberg et al. | |

(Continued)

OTHER PUBLICATIONS

Kellar, Melanie, Hawkey, Kirstie, Inkpen, Kori and Watters, Carolyn, "Challenges of Capturing Natural Web-Based User Behaviors," Intl. Journal of Human-Computer Interaction, 24(4), 385-409, 2008.

*Primary Examiner* — Renae Feacher
(74) *Attorney, Agent, or Firm* — Lerner David LLP

(57) ABSTRACT

A method of responding to a criterion-based request for information collected from users meeting the criterion while complying with a user-requested privacy requirement. In one embodiment a request is received for data comprising facial or audio expressions for users who meet the criterion. A program monitors activities indicative of user attention or user reaction based on face tracking, face detection, face feature detection, eye gaze determination, eye tracking, audio expression determination, or determination of an emotional state. When a user requests a high level of privacy, the timestream data collected for the user is aggregated with timestream data collected for other users into a statistical dataset by processing the timestreams to ensure the high level of privacy in the statistical dataset which is provided to a content provider without providing data collected for the user who has requested the high level of privacy.

18 Claims, 5 Drawing Sheets

(56) References Cited

U.S. PATENT DOCUMENTS

| | | |
|---|---|---|
| 7,916,971 B2 | 3/2011 | Bigioi et al. |
| 7,953,251 B1 | 5/2011 | Steinberg et al. |
| 7,995,795 B2 | 8/2011 | Steinberg et al. |
| 8,005,268 B2 | 8/2011 | Steinberg et al. |
| 8,135,184 B2 | 3/2012 | Steinberg et al. |
| 8,155,397 B2 | 4/2012 | Bigioi et al. |
| 8,189,927 B2 | 5/2012 | Steinberg et al. |
| 8,213,737 B2 | 7/2012 | Steinberg et al. |
| 8,265,348 B2 | 9/2012 | Steinberg et al. |
| 8,285,001 B2 | 10/2012 | Steinberg et al. |
| 8,320,641 B2 | 11/2012 | Steinberg et al. |
| 8,330,831 B2 | 12/2012 | Steinberg et al. |
| 8,363,951 B2 | 1/2013 | Bigioi et al. |
| 8,363,952 B2 | 1/2013 | Bigioi et al. |
| 9,727,645 B2 * | 8/2017 | Peters .................. G06F 16/951 |
| 2003/0023451 A1 * | 1/2003 | Willner .............. G06F 21/6245 |
| | | 705/26.1 |
| 2003/0051157 A1 * | 3/2003 | Nguyen ................. H04L 63/04 |
| | | 726/4 |
| 2003/0229892 A1 * | 12/2003 | Sardera ............. H04N 21/6156 |
| | | 725/110 |
| 2009/0189998 A1 | 7/2009 | Nanu et al. |
| 2009/0287657 A1 | 11/2009 | Bennett et al. |
| 2010/0318492 A1 * | 12/2010 | Utsugi ................... G06F 16/20 |
| | | 707/603 |
| 2011/0046504 A1 * | 2/2011 | Pradeep ................ A61B 5/378 |
| | | 600/546 |
| 2011/0202881 A1 * | 8/2011 | Singh .................... G06Q 30/02 |
| | | 715/833 |
| 2012/0010679 A1 | 1/2012 | Edvinsson |
| 2012/0075504 A1 | 3/2012 | Steinberg et al. |
| 2012/0105687 A1 | 5/2012 | Nanu et al. |
| 2012/0207358 A1 | 8/2012 | Blonk et al. |
| 2012/0215898 A1 * | 8/2012 | Shah .................. H04L 65/1069 |
| | | 709/223 |
| 2012/0218398 A1 | 8/2012 | Mehra |
| 2012/0219180 A1 | 8/2012 | Mehra |
| 2012/0256820 A1 | 10/2012 | Uppuluri et al. |
| 2012/0229694 A1 | 12/2012 | Steinberg et al. |
| 2013/0044199 A1 | 2/2013 | Nanu et al. |
| 2013/0050395 A1 | 2/2013 | Paolei et al. |
| 2013/0054366 A1 | 2/2013 | Roundtree et al. |
| 2013/0057553 A1 | 3/2013 | Chakravarthula et al. |
| 2013/0057573 A1 | 3/2013 | Chakravarthula et al. |
| 2013/0124628 A1 * | 5/2013 | Weerasinghe ..... G06Q 30/0241 |
| | | 709/204 |
| 2013/0282605 A1 * | 10/2013 | Noelting ................ G06Q 10/10 |
| | | 705/321 |
| 2014/0156654 A1 | 6/2014 | Dutta et al. |

* cited by examiner

ANONYMIZING FACIAL EXPRESSION DATA WITH A SMART-CAM

BENEFIT CLAIM

This application is a continuation of U.S. application Ser. No. 14/282,790 filed May 20, 2014 which claims the benefit of U.S. Provisional Patent Application No. 61/825,933, filed May 21, 2013, the entire contents of which are hereby incorporated by reference.

BACKGROUND

In today's Web and Cloud computing infrastructures there is a growing desire to be able to monitor and show a user's response to Web content, advertising, and the like.

There is increasing sensitivity about the privacy of individual users. That is, detailed knowledge of a person's response to Web media or content can constitute an invasion of personal privacy. Thus, while it may be technically possible to obtain such data, it would be unpopular, if not legally or ethically problematic, for marketing and advertising professionals to do this outside of controlled environments and focus groups.

Some protection of a user could be achieved using an "anonymity network" which hides the originating user's IP address and location from the recipient using a secure peer-to-peer network on top of the standard Internet. Unfortunately such an approach is easily circumvented by creating unique URLs for each user to access a website. Thus the content provider has only to match this unique URL with a set of "user reaction data" and they can determine individual reactions. Most Web servers can trace the IP address where they sent Web data. If that Web data is unique, a user can be linked with an IP address when "user reaction data" is returned together with the URL being viewed.

DETAILED DESCRIPTIONS OF THE EMBODIMENTS

Figure 2:
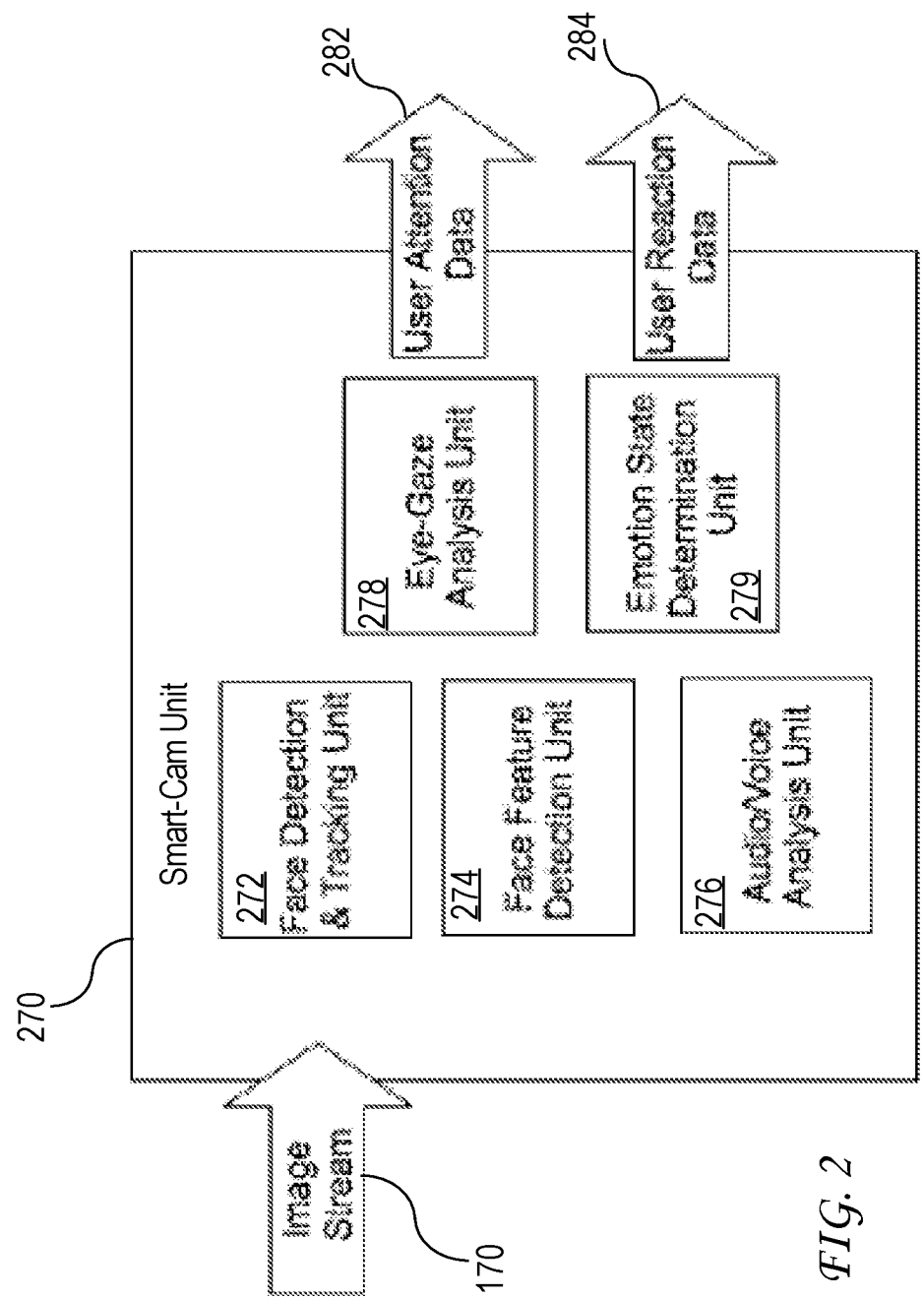
FIG. 2 illustrates an example smart-cam unit in accordance with certain embodiments.

FIG. 2 illustrates an example smart-cam unit 270 in accordance with certain embodiments. In FIG. 2, image stream 170 is provided to smart-cam unit 270, processed by a plurality of components of smart-cam unit 270 to generate at least two types of outputs, including user attention data 282 and user reaction data 284.

Image stream 170 may be captured by and ported to smart-cam unit 270 by a variety of devices, including cameras, eye-tracking monitors, face-tracking monitors, microphones, and the like.

Image stream 170 may include information about images that a user has been viewing on a display device. For example, image stream 170 may include information about programs, movies, or advertisement that the user has been viewing on his computer, laptop, smartphone, and the like.

Figure 1:
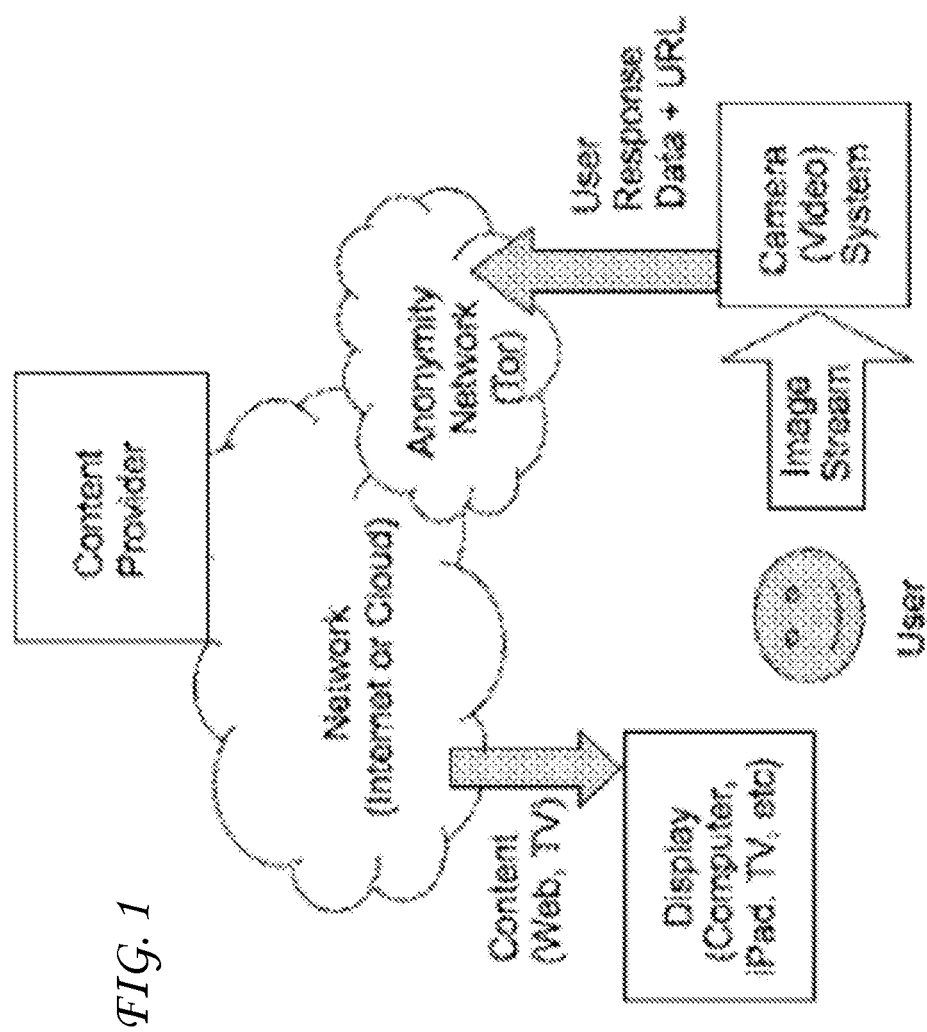
FIG. 1 illustrates the Tor approach.

Such data may correspond to data also collected by a Tor-based system, depicted in FIG. 1.

Tor was originally designed, implemented, and deployed as a third-generation onion routing project of the U.S. Naval Research Laboratory. Tor is a method of re-routing the Internet traffic in such a way so that the Internet IP address of the traffic originator cannot be traced. Normally, every time a user accesses the Internet, the originating web server stores information about the IP address of the user. Since in some situations the user may not want to reveal his IP address to others, the user may want to rely on Tor-based services to make the tracing of the user's IP address difficult. For example, according to the Tor approach, the web-access requests may be re-routed through a network of Tor-proxies, so the user's apparent IP address is constantly changing, and thus, is difficult to trace.

Image stream 170 may also include data that captures interactions of a user with images, television programs, movies, advertisements, and the like, displayed on a display device of the user's computer.

Image stream 170 may also include data collected by an eye-tracking system and/or a face-tracking system, each equipped with one or more cameras pointed at a user, and collecting depictions of the user as the user is watching the contents displayed on a display device.

Image stream 170 may also include audio data collected by smart-cam unit 170 as the user is watching the contents displayed on a display device.

In an embodiment, an intelligent smart-cam (or smart-webcam) unit 270 may be used to monitor a user as she or he is browsing/viewing content and data. The monitoring may be performed using a wide range of advanced image processing techniques, including smart cameras and eye-tracking monitors configured to monitor a person's eye-gaze and a person's facial expressions. Examples of the advanced image processing techniques are described in US published patent applications nos. 2009/0189998, 2012/0105687, 2012/0256820, 2012/0219180, 2012/0207358, 2013/0057573, 2013/0057553, 2012/0229694, 2013/0044199, 2012/0075504, and 2012/0218398, contents of which are hereby incorporated by reference.

Advanced image processing techniques may also use embedded face models, and various techniques for analyzing and determining one or more facial expressions of a user. For example, smart cameras and/or face-tracking devices may capture digital images of a user as the user explores different locations on a web page, or views different scenes in a movie, a photograph, or a slideshow of photographs. Examples of the advanced image processing techniques for analyzing and determining facial expressions are described in U.S. Pat. Nos. 8,135,184, 8,155,397, 8,189,927, 8,213,737, 8,265,348, 8,285,001, 8,320,641, 8,330,831, 8,363,951, 8,363,952, 7,551,754, 7,620,218, 7,792,335, 7,804,983, 8,005,268, 7,995,795, 7,953,251, and 7,916,971 and US published patent applications nos. 2013/0050395, and 2012/0106790, contents of which are hereby incorporated by reference.

Smart-cam unit 270 may include software and hardware components, and may be configured to receive data collected as a user is viewing and interacting with the Internet-based contents, and to process the received data.

Outputs generated by smart-cam unit 270 may be ported to other processing units for further processing. One of the purposes of the further processing may include protecting the anonymity of users, including protecting user's location information, such as URL and/or IP addresses utilized by the user.

In an embodiment, smart-cam unit 270 processes the image stream to determine information about (1) the focus of the user's attention, and (2) the emotional reactions of the user as the user is viewing and interacting with the Internet-based contents. The information about the user's attention and reactions may be valuable to marketing and advertising professionals.

User attention and user reaction data might be used by smart-cam unit 270 for further processing. For example, the user attention and user reaction data may be time-stamped, and the timestamped data may be associated with a history of for example, a web browsing session established for the user or a history of a television program viewing session established for the user.

Information about the user's emotions, focus and attention may be extrapolated from facial expressions, and other multimedia queues such as voice patterns and voice pitch, vocal expressions, and the way the user types on a keyboard, or interacts with a mouse, touchscreen or equivalent peripheral.

In an embodiment, smart-cam unit 270 is configured to perform image processing and/or sound analysis of image stream 170, and to output user attention data 282 and user reaction data 284.

Both user attention data 282 and user reaction data 284 may be provided to other units in a form of a "timestream." For example, user attention data 282 and user reaction data 284 may be recorded in relation to a timeline so that not only the emotional state of the user, but also transitions between states and indeterminate states are recorded. Typically, the data may be output at one-second-long intervals, but in some implementations, a finer granularity may be desirable. For example, user attention data 282 and user reaction data 284 may be output at a half-second-long time intervals.

In some applications a timeline may be used to reference user attention data 282 and user reaction data 284. The timeline reference may be non-linear. In other words, if a user remains in a particular state for a long period of time, then, in certain embodiments, the start and end of that state may be recorded, or the intervals may be increased for output of the user attention and user reaction data. In other cases, the time intervals may be compressed.

In an embodiment, a camera system acquires an image stream 170. Images of the image stream are analyzed using a face detection and tracking unit 272, a face feature detection unit 274, and optionally an audio/voice analysis unit 276. Another embodiment analyses only audio/voice data.

An eye gaze analysis unit 278 is applied to faces in the stream and user attention data 282 is output based on the eye gaze analysis and known directions of objects.

An emotion state determination unit 279 is applied to face in the stream and user reaction data 284 is output based on the user reaction analysis.

Both sets of output data, including user attention data 282 and user reaction data 282, are provided within timestream data in order to match the emotion states with the objects being focused on at or around the same time.

The timestream data may be synchronized with browser data from the computer that it is associated with. Typically, a camera will be mounted on, or integrated into the computing and display device. Examples of display devices may include a desktop computer, a laptop, a connected TV, or a handheld or otherwise mobile device. Typically, the browsing data will be accessed using a web plugin which may be associated with the smart-cam 270. Data is analyzed from the browsing history, "user reaction" and "user attention" datasets. This analysis may be performed on either the computing device, or, in some embodiments, in the smart-cam 270 itself.

After this analysis, an absolute time reference may be converted to a relative time reference, with the start time being for example the beginning of the current browsing session. In some applications it may be desirable to limit browsing sessions to predetermined time intervals, e.g., 15 minute-long datasets. This is partly to prevent accumulation of very large datasets, but also to establish a base unit of "information" for later processing & statistical analysis.

Data is associated with a specific URL/URI, or one or more URIs contained within a parent URL/URI. Data for URL/URIs which are not registered with the trusted third party (TTP) are not recorded in certain embodiments. Either the smart-cam or the host PC/Laptop/TV/handheld/mobile device connects with the Internet, and thus the TTP. The web camera is typically just USB with HID extensions. Gaze and/or emotions may be optionally correlated with some speech recognition, e.g., with or without direct network connectivity. In certain embodiments, the host laptop/TV/PC/handheld/mobile device will do all the synchronization between the status of the user, i.e., gaze and emotions/reactions, and the status of the display/browser.

When specific URL/URIs are completed to load, a final report is prepared and uploaded to the TTP. This "timestream" data is now transmitted in certain embodiments to a Web/Cloud service where it is processed by a trusted third party service provider. Both the content provider and the smart-cam are registered with this TTP service.

Suppose a user is browsing items offered on the Amazon.com website. To increase their revenue, Amazon's content provider may want to know what pages the user was viewing, which "offers" from Amazon.com the user was reviewing, how much time the user spent viewing certain "offers," and the like. In some cases, the content provider may want to monitor the browsing sessions of certain users, and may maintain certain ongoing relationships with the customers. For example, a certain customer, who regularly uses Google and who meets certain demographics criteria, may agree to provide his demographic information to Google, be "classified" as part of a certain market sector, and provide his web-search-based data to Google when Google requests data from such a market sector. In some situations, a user may receive an award from a content provider for sharing his data with the content provider. For example, the user may receive a credit toward future purchases, coupons, and the like. However, if a user is browsing content from a content provider, but the user does not rely on TTP services, then the content provider may have access to the user's personal information, including the user's IP address, and the like. To protect the user's personal information, the user may subscribe to the TTP services, and rely on the TTP services to for example, obscure the user's IP address, and the like. Hence, the TTP may be viewed as a broker between the user, whose browsing and viewing history is collected, and a content provider, who consumes the user's browsing and viewing history data.

In an embodiment, TTP services may be used to match the content providers seeking "potential customers" with the users who may meet the criteria of the "potential customers."

In an embodiment, a content provider registers a set of URL/URIs from which the content provider wishes to receive various statistical data. These are held by the TTP service that bears the responsibility to handle user data and to preserve user anonymity to an extent decided and agreed by the user, and in accordance with applicable legal and ethical demands. In certain embodiments, the TTP and the content/service provider might be part of a single business entity that wishes to obtain data. The entity may utilize means to explicitly demonstrate/prove that data is gathered in a pre-defined and acceptable manner and with user's consent.

In certain embodiments, the TTP service also maintains a registered database of users who choose to register and enable their smart-cam to provide "time-stream" data to the TTP. This allows the TTP to act as a broker for users and to remunerate the users for providing user data.

In an embodiment, a user registration process may also be anonymous and users, or rather "personal data providers," may be uniquely identified based on their IP address, or host machine name, or based on a unique code or username/password combination. In certain embodiments, where a user's anonymity is particularly important, and methods such as Zero-Knowledge Proof (ZKP) may be incorporated into the authentication mechanisms of the system.

Figure 3:
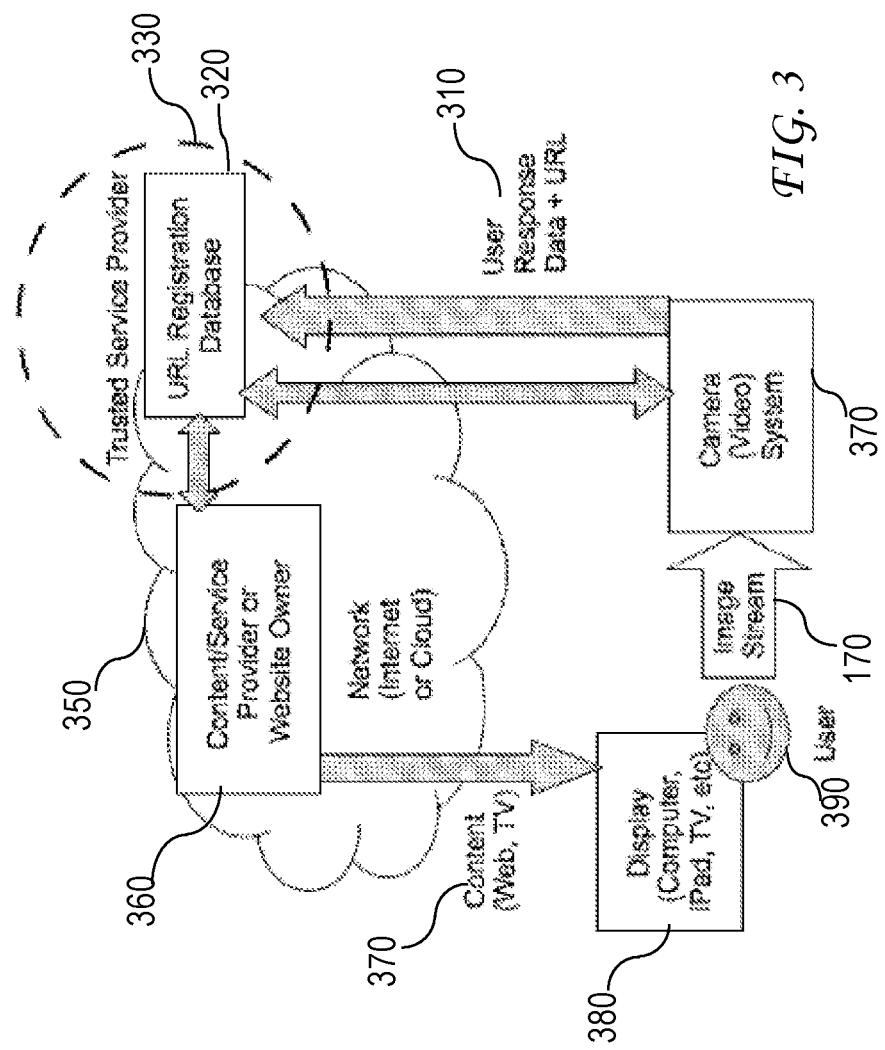
FIG. 3 illustrates data analysis by a trusted third party (TTP).

FIG. 3 illustrates data analysis performed by a TTP service. As user 390 views and interacts with content 370 displayed on a display 380 and provided by a content service provider 360, image stream 170 is collected and provided to a camera/video system 370, such as a smart-cam unit 270 described above. Timestream data 310 from camera/video system 370 may contain user response, emotions and/or reactions data and an URL address associated with the user's device. When timestream data 310 is obtained at the TTP 330, the data may be extracted into "sub-streams" each of which may be associated with a specific URL/URI.

If the user 170 has requested a high level of privacy, then this data may be used as part of a statistical dataset which is provided by the TTP 330 to the content provider 360. A typical statistical dataset might include data from at least 100 users.

Users may have the option to choose a lower privacy level, which might involve a lower number of user datasets used to compile the statistical analysis, or, in the extreme, their data could be made available as an "individual dataset." It would still be anonymous as there are no absolute timestamps, although it is conceivable that a content provider could still match the "browsing duration" of an element of content to that of individual users.

In an embodiment, content providers 360 may pay the TTP 330 for access to statistical and individual user data and the TTP 330. Furthermore, the TTP 330 may reward users, who registered with TTP 330, for their data based in part of the quantity of data provided and the privacy level chosen by the user.

User 390 may subscribe to services provided by TTP 330. During a registration process with TTP 300, user 390 may create his user profile. In the user profile, user 390 may specify a demographic profile that corresponds to the user's demographic characteristics. User 390 may also specify his personal or market-segment data that may be used to compile statistical datasets. User 390 may also provide his geographical location information. Furthermore, user 390 may specify the types of computer devices that the user is using to browse the Internet's content, and the applications or products that the user is using. User 390 may also provide other types of information. All information entered by user 390 into his registration profile may be used to include user 390 in various categories. Each category may have associated certain criteria, which may be used to facilitate searches for users according to the certain criteria. Such criteria may include demographic characteristics, geographical location, types of user's devices, types of user's application, and the like. User registration information may be stored in a URL registration database 320. URL registration database 320 may be part of TTP 330.

In an embodiment, TTP 330 may receive a request to provide statistical datasets generated based on time streams collected from users who meet certain criteria. For example, TTP 330 may receive a request from a particular content provider to provide statistical datasets from users who meet certain criteria. The criteria may include certain demographic characteristics, certain geographical location, certain applications that the users are using, and the like. TTP 330 may also receive a request from a particular content provider to provide statistical datasets from users who are located at a particular geographic area, own particular devices or use particular products. Upon receiving such a request, TTP 330 may extract the criteria from the request, and use the criteria to identify, from the users who have registered with the TTP service, those users who meet the criteria. Once such users are identified, TTP 330 may select time streams collected from or otherwise provided by the users, process the time streams to ensure certain privacy levels in the streams, generate statistical datasets from the processed time streams, and provide the statistical datasets to the content provider.

In an embodiment, a device time-stream data may include device data other than direct user observation data. Such other device data may include user's device location data, user's device status, user's device settings information or data relating to other aspects of the device's function. For example, a smartphone user might chose to stream location and motion data to a traffic monitoring service to provide useful information on both a traffic speed and a traffic density of the road traffic that the user is experiencing. The traffic speed may be determined based on for example, the motion data collected for the user's mobile phone. The traffic density data may be determined by accumulating data from the users who travel along a particular route.

In an embodiment, a connected smart-device may provide anonymous data on its daily usage patterns and settings to allow a device's manufacturer to gather data related to usage patterns for the manufacturer's products.

In an embodiment, the data, such as traffic speed data, may be provided in the near-real-time in order to be valuable to the service provider.

While an exemplary drawing and specific embodiments have been described and illustrated, it is to be understood that that the scope of the presented approach is not to be limited to the particular embodiments discussed. Thus, the embodiments shall be regarded as illustrative rather than restrictive, and it should be understood that variations may be made in those embodiments by persons skilled in the arts without departing from the scope of the presented approach, as set forth in the claims below and structural and functional equivalents thereof.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
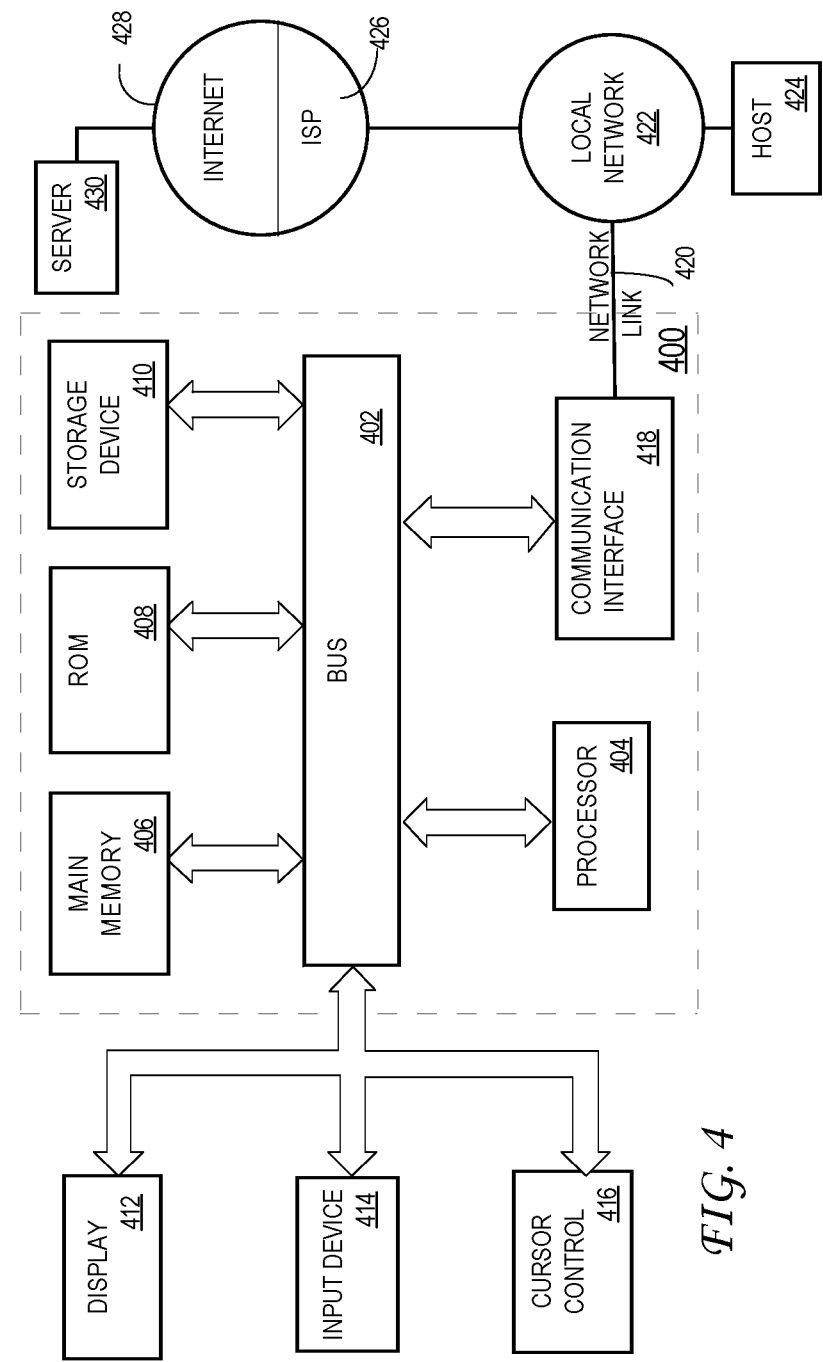
FIG. 4 is a block diagram that illustrates a computer system upon which an embodiment may be implemented.

For example, FIG. 4 is a block diagram that illustrates a computer system 400 upon which an embodiment of the presented approach may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Figure 5:
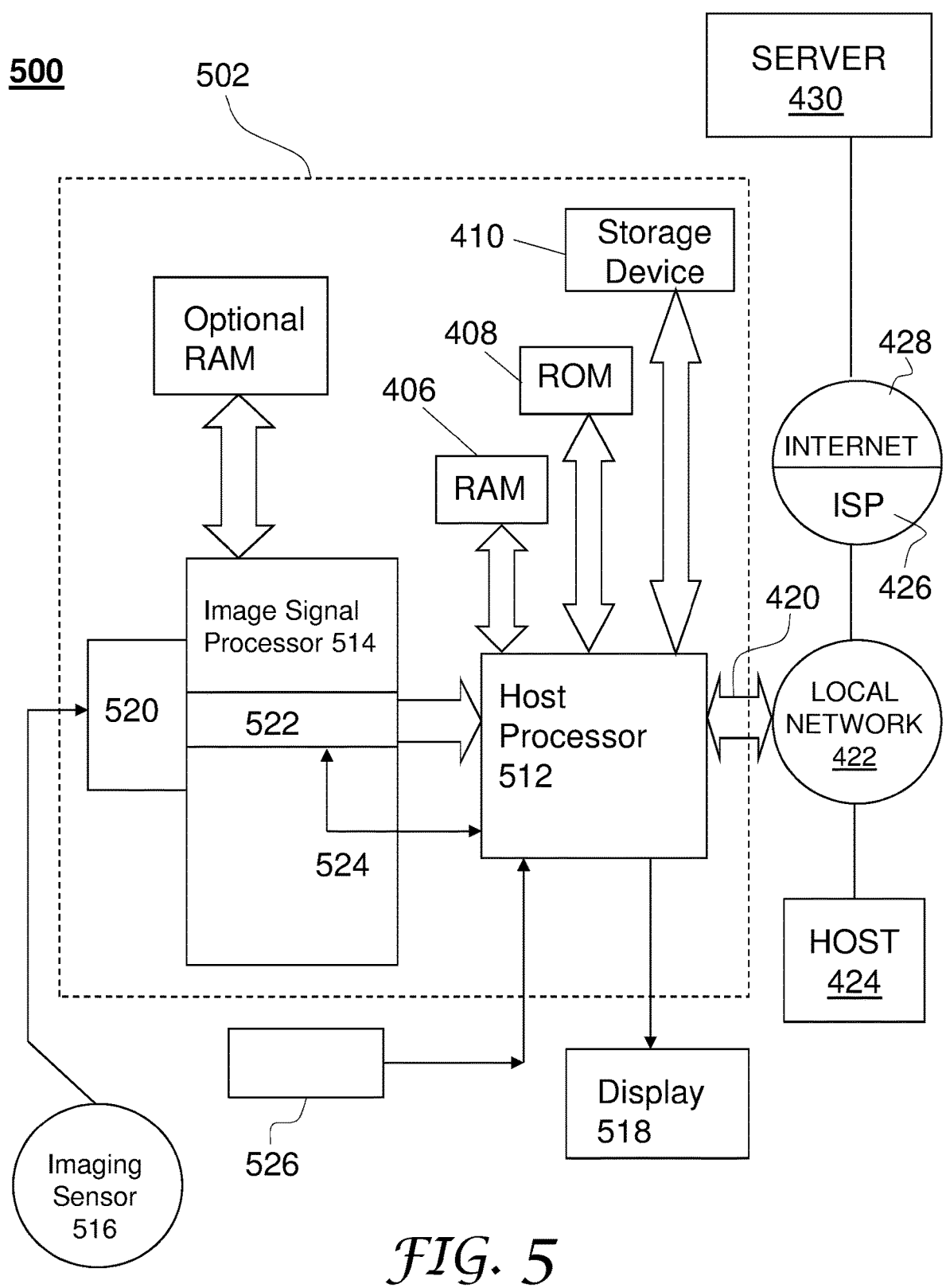
FIG. 5 is another block diagram that illustrates a computer system upon which an embodiment may be implemented.

FIG. 5 illustrates a digital image acquisition system 500 comprising a computer system 502 according to an embodiment of the invention. As described for the embodiment of FIG. 4, the computer system 502 is connected through a network link 420 and a local network 422, to a host computer 424, or to data equipment operated by an ISP 426 to internet 428. ISP 426, in turn, provides data communication services through the Internet 428. Local network 422 and Internet 428 both use electrical, electromagnetic or optical signals that carry digital data streams. The computer system 502 can send messages and receive data, including program code, through the network link 420, local network (s) 422, and a communication interface (not shown) such as Interface 418 described in FIG. 4. In the interne example, a server 430 might transmit requested code for an application program through Internet 428, ISP 426, local network 422, network link 420, and a communication interface to a Host Processor 512. The received program code may be executed by the processor 512 or an Image Signal Processor as it is received and/or stored in a storage device 410 or other non-volatile storage for later execution.

The system 500 is based on FIG. 4 of the present application and FIG. 1 of U.S. Pat. No. 8,155,397 ('397) which has been incorporated by reference. It is to be understood that various components shown in FIG. 5 may be part of the computer system 502 or may be connected there though, e.g., such as through Local Network 422 and/or the Internet as illustrated in FIG. 4. Generally, the system 500 comprises an Image Signal Processor 514 which may be a general purpose computer processing unit (CPU) with relatively limited processing power. Typically, the Image Signal Processor 514 is a dedicated chip or chip-set with a sensor interface 520 having dedicated hardware units that facilitate image processing including image pipeline 522. Images acquired by an imaging sensor 516 are provided to the Image Signal Processor 514 through the sensor interface 520. The system 500 further comprises a relatively powerful host processor 512, for example, an ARM9, which is arranged to receive an image stream from the Image Signal Processor 514. The system 500 is equipped with a display 518, such as an LCD, for displaying images and an audio output. An input device (not shown), as described for the embodiment of FIG. 4, including alphanumeric and other keys, is coupled to host processor 512 for communicating information and command selections to host processor 512. Cursor control (not shown), also as described for the embodiment of FIG. 4, such as mouse, trackball, or cursor direction keys, is coupled to host processor 512 for controlling cursor movement on display 518. Conventionally, high level image processing, such as face tracking, may run on the host processor 512 which provides feedback to the pipeline 522 of the Image Signal Processor 514. The Image Signal Processor 514 then renders, adjusts and processes subsequent image(s) in the image stream based on the feedback provided by the host processor 512, typically through an I2C interface 524.

In the embodiment of the system 500, a face tracking process runs on the Image Signal Processor 514 as opposed to the host processor 512. Thus, more processing power of the host processor is available for further value added applications, such as face recognition. The system 500 may also provide eye tracking, facial expression monitoring, and audio monitoring based on a microphone sensor input 526. Furthermore, parameters of an acquired image, such as focus, exposure and white balance, can be adaptively adjusted by the Image Signal Processor 514.

As will be appreciated, face tracking applications carried out on high resolution images will generally achieve more accurate results than on relatively lower resolution images. With the processing power of the Image Signal Processor 514 being limited, the arrangement of face tracking applications is optimized to run efficiently on the Image Signal Processor 514.

What is claimed is:

1. A computer-implemented method comprising:
   identifying a level of privacy requested by a user of a plurality of users;
   collecting timestream data associated with a user session associated with the user, wherein the timestream data includes at least a start-time time stamp and an end-time time stamp;
   retaining the timestream data as collected timestream data consistent with the level of privacy;
   receiving, from a content provider, a request for information collected from at least one of the plurality of users who meet one or more criteria, wherein the one or more criteria includes at least one of:
   a type of computer device used by the user; or
   a computer-based product used by the user;
   determining that the user meets the one or more criteria;
   executing computer instructions on a computer processor, the computer instructions configuring the computer to perform operations on the collected timestream data, the operations comprising:
   performing analysis, on the collected timestream data, the analysis including at least one of:
   image analysis or audio analysis;
   detecting, based on the analysis, a user attention state for the user from the collected timestream data for the user session;
   recording a transition from the user attention state to another user attention state and processing, based on the level of privacy requested, the collected timestream data and results of the analysis to obtain processed timestream data, the processing to determine that the level of privacy in the processed data complies with the level of privacy requested by the user, the processing including calculating a relative time reference based on the start-time time stamp and the end-time time stamp; and
   generating one or more statistical datasets based on the processed timestream data;
   aggregating the one or more statistical datasets with other statistical dataset established from a history of user session of the user to create an aggregated statistical dataset; and
   providing the aggregated statistical datasets to the content provider responsive to the request for information.

2. The method of claim 1, further comprising receiving the timestream data from a smart-cam device.

3. The method of claim 1, the user session including at least one of a browsing session or a purchase transaction session.

4. The method of claim 1, further comprising:
   identifying location information associated with the user; and
   obfuscating, in the processed timestream data, the location information associated with the user based at least on the level of privacy requested, the location information associated with the user including at least one of: an Internet Protocol (IP) address associated with a computer device associated with the user, a Uniform Resource Locator (URL) associated with the computer device associated with the user, or a Uniform Resource Identifier (URI) associated with the computer device associated with the user.

5. The method of claim 1, further comprising:
determining that the level of privacy requested by the user is identified as a high level of privacy.

6. The method of claim 1, further comprising:
obtaining, from a user registration profile associated with the user, the level of privacy requested by the user; and
identifying from the user registration profile associated with the user criterion including at least one of:
   a type of data authorized for sharing with a content provider,
   demographic profile data associated with the user,
   personal data the user authorizes for use in generating a statistical dataset,
   market segment data the user authorizes for use in generating the statistical dataset,
   geographical location information associated with the user, or
   a reward scheme the user accepts for compensation for being included in the statistical dataset.

7. The method of claim 1, the image analysis or audio analysis comprising at least one of: facial detection, facial tracking, facial feature detection, eye tracking, gaze determination, audio capture, audio expression determination, or emotional state determination.

8. A non-transitory computer readable storage medium storing instructions that, when executed by a processor, cause the processor to perform operations comprising:
   identifying a level of privacy requested by a user of a plurality of users;
   collecting, as collected-timestream data, timestream data associated with a user session of the user consistent with the level of privacy, the collected-timestream data including at least a start-time time stamp and an end-time time stamp;
   receiving, from a content provider, a request for information collected from at least one of the plurality of users who meet a criterion;
   determining that the user meets the criterion;
   analyzing the collected-timestream data related to at least one of the start-time time stamp and the end-time time stamp, the analyzing including performing at least one of image analysis or audio analysis;
   detecting, based on the analyzing, a user attention state for the user from the collected-timestream data for the user session;
   recording a transition from the user attention state to another user attention state; and
   based on the level of privacy, processing the collected-timestream data to obtain processed-timestream data, the processing to ensure the level of privacy in the processed-timestream data complies with the level of privacy requested by the user, the processing including calculating a relative time reference based on the start-time time stamp and the end-time time stamp;
   generating one or more statistical datasets from the processed-timestream data; and
   aggregating the one or more statistical datasets with other statistical datasets established from a history of user sessions of the user to create an aggregated statistical dataset; and
   providing the aggregated-statistical dataset to the content provider responsive to the request for information.

9. The non-transitory computer readable storage medium of claim 8, the instructions to cause the processor to perform operations further comprising receiving the timestream data from a smart-cam device.

10. The non-transitory computer readable storage medium of claim 8, the instructions to cause the processor to perform operations further comprising:
   associating a time interval with the transition from the user attention state to another user attention state, the time interval related to the start-time time stamp and the transition.

11. The non-transitory computer readable storage medium of claim 8, the instructions to cause the processor to perform operations further comprising:
   detecting, based on the analyzing, a user reaction state for the at least one user from the collected-timestream data for the user session;
   recording a transition from the user reaction state to another user reaction state; and
   associating a time interval with the transition, the time interval related to the start-time time stamp and the transition.

12. The non-transitory computer readable storage medium of claim 8, the instructions to cause the processor to perform operations further comprising:
   establishing a timeline of a plurality of user sessions of the user;
   associating time stamps from the plurality of user sessions with the history of user sessions in relation to the timeline; and
   determining respective relative time references for the plurality of user sessions based on a start-time time stamp of respective of the plurality of user sessions.

13. The non-transitory computer readable storage medium of claim 8, the instructions to cause the processor to perform operations further comprising outputting the timestream data at a certain time interval based on one or more time stamps.

14. A device, comprising:
a processor; and
a memory unit included in a trusted service unit associated with a trusted third party (TTP), the memory unit having computer-executable instructions recorded thereon that, upon execution, configure the device to perform operations comprising:
   collecting, as collected timestream data, timestream data associated with a user session of a user of a plurality of users the collected timestream data including at least a start-time time stamp and an end-time time stamp;
   performing analysis, on the collected timestream data, the analysis including at least one of:
   image analysis or audio analysis;
   detecting, based on the analysis, a user attention state for the user from the collected timestream data for the user session;
   recording a transition from the user attention state to another user attention state determining a level of privacy requested by the user;
   processing, based on the level of privacy requested, the collected timestream data to obtain processed timestream data that complies with the level of privacy requested by the user;
   receiving, from a content provider, a request for information collected from at least one of the plurality of users who meet a criterion;

determining that the user meets the criterion;

retrieving the collected timestream data associated with the user session of the user;

generating one or more statistical datasets from the processed timestream data; and determining a fee for making the statistical dataset accessible to the content provider based on the criterion.

15. The device of claim 14, the device further configured to perform the determining the fee for making the statistical dataset accessible to the content provider on a content-provider agreement between the trusted third party (TTP) and the content provider.

16. The device of claim 14, the device further configured to perform the determining the fee for making the statistical dataset accessible to the content provider based at least on the criterion.

17. The device of claim 14, the device further configured to perform a further operation comprising determining an award for the user based on at least one of the criterion or the level of privacy requested.

18. The device of claim 14, the device further configured to perform a further operation comprising determining an award for the user based on a user agreement between the trusted third party (TTP) and the user.

* * * * *